United States Patent [19]

Obayashi et al.

[11] Patent Number: 4,866,415

[45] Date of Patent: Sep. 12, 1989

[54] TONE SIGNAL GENERATING SYSTEM FOR USE IN COMMUNICATION APPARATUS

[75] Inventors: Arata Obayashi; Ryohei Oba, both of Hino, Japan

[73] Assignee: Kabushiki Kaisha Toshiba, Kawasaki, Japan

[21] Appl. No.: 145,737

[22] Filed: Jan. 19, 1988

Related U.S. Application Data

[63] Continuation of Ser. No. 613,637, May 24, 1984, abandoned.

[30] Foreign Application Priority Data

Dec. 28, 1983 [JP] Japan .................. 58-248010

[51] Int. Cl.$^4$ .............................................. G08B 3/00
[52] U.S. Cl. ..................... 340/384 E; 340/384 R
[58] Field of Search ............... 340/384 E, 384 R; 381/36, 40, 51, 52; 341/22, 24

[56] References Cited

U.S. PATENT DOCUMENTS

| | | |
|---|---|---|
| 3,624,302 | 11/1971 | Bishnu et al. .................. 381/51 |
| 4,271,495 | 6/1981 | Scherzinger et al. ........... 340/384 E |
| 4,351,999 | 9/1982 | Nagamoto et al. ............. 340/384 E |
| 4,386,340 | 5/1983 | Satoh ............................. 340/384 E |
| 4,449,232 | 5/1984 | Hashimoto et al. ........... 340/384 E |
| 4,475,228 | 10/1984 | Vickers .............................. 381/51 |
| 4,560,978 | 12/1985 | Lemelson ........................... 381/51 |
| 4,577,343 | 3/1986 | Oura .................................. 381/51 |

Primary Examiner—David K. Moore
Assistant Examiner—M. Fatahiyar
Attorney, Agent, or Firm—Finnegan, Henderson, Farabow, Garrett, & Dunner

[57] ABSTRACT

A tone signal is formed by repeatedly reading out digital data stored in a memory device. Thus a predetermined tone wavefrom signal is stored in the memory device as data corresponding to the amplitude value at a plurality of sampling points and the data are repeatedly read out at a predetermined speed. A quasi sine wave signal is formed based on the read out signal. Harmonic components are eliminated from the quasi sine wave signal with a lowpass filter, thereby forming a desired tone signal.

5 Claims, 6 Drawing Sheets

TONE SIGNAL GENERATING SYSTEM FOR USE IN COMMUNICATION APPARATUS

This application is a continuation of application Ser. No. 06/613,637, filed May 24, 1984, now abandoned.

BACKGROUND OF THE INVENTION

1. Field of the Invention

This invention relates to a tone signal generating system for use in communication apparatus, and more particularly a tone signal generation system wherein a tone signal generating capability is provided to memory means provided in the system.

2. Description of the Prior Art

A tone squelch system in which a tone signal generating circuit is provided in a transmitter and in which a squelch circuit contained in a receiver is controlled in accordance with a tone signal generated by the tone signal generating circuit, including a tone control system that controls the transmission apparatus have been proposed.

FIG. 1 is a block diagram showing such a transmitter/receiver, particularly a multichannel access system utilizing the tone squelch system described above.

During the waiting state, a frequency synthesizer of the transmitter/receiver, not shown, is controlled so as to acquire a predetermined control channel. When there is a call signal to each transmitter/receiver or to a group in which a plurality of transmitter/receivers are involved, the synthesizer is caused to acquire a speaking channel which is indicated by a signal from the control channel. Then, the transmitter receiver transmits or receives the signal through the speaking channel.

Transmission and reception operations after a speaking channel has been selected will be described as follows, referring to the accompanying drawings.

A transmitter 1 consists of a transmitting circuit 5 which modulates a voice signal produced by a microphone 2 and transmits the modulated signal through an antenna 4 via an antenna transmit/receive switch 3, a tone signal generating circuit 8 comprising an oscillation circuit 6 and a phase-reversal circuit 7, a press to talk signal delay circuit 9, and an inverter 11 connected between the press talk signal delay circuit 9 and a press to talk switch 10. One end of the press to talk switch 10 is grounded, while the other end is supplied with a predetermined positive voltage via a resistor 12. The press to talk signal delay circuit 9 consists of an inverter 13, an AND gate circuit 14, a delay circuit 15 and OR gate circuit 16.

After a speaking channel has been selected, when the press to talk switch 10 is closed at time $t_1$ the output of the inverter 11 becomes a high level. This output signal is applied to one input of the OR gate circuit 16 as a transmission enable signal A shown in FIG. 2a. The output B (see FIG. 2b) of the OR gate circuit 16 becomes H (high) level, and is applied to the oscillation circuit 6 so as to produce a tone signal which is supplied to the phase-reversal circuit 7. At this time the output of the inverter 13 is at a low level, and the output of the AND gate circuit 14 also becomes the low level. Consequently, the phase of the tone signal is not reversed and the tone signal is input, as it is, to the transmitting circuit 5 as a tone signal D shown in FIG. 2d. When the press to talk switch 10 is opened at time $t_2$, the output of the inverter 11, i.e., transmission enable signal A, becomes low, whereas the output of the inverter 13 becomes high. The output of the OR gate circuit 16 is maintained at the high level by the delay circuit 15 during an interval $\Delta T$ between times $t_2$ and $t_3$. Accordingly, the output of the tone signal D from the oscillating circuit 6 will be continued up to time $t_3$, and the output of the OR gate circuit 16 is also supplied to the transmitting circuit 5 as the delay request signal B shown in FIG. 2b. During an interval $\Delta T$ between times $t_2$ and $t_3$, the output C (See FIG. 2c) of the AND gate circuit 14 becomes high level so as to send a phase-reversal control signal to the phase-reversal circuit 7, whereby the phase-reversal circuit 7 reverses and outputs tone signal D. The transmitting circuit 5 transmits a transmission signal containing a non-reversed and reversed tone signal D through the antenna. In the waiting state when no control channel is selected, the transmitter 1 is controlled to not send the tone signal irrespective of the ON-OFF states of the press to talk switch 10.

Receiver 21 shown in FIG. 1 comprises a receiving circuit 22 which demodulates a signal received through the antenna 4 and antenna transmit/receive switch 3, a low frequency amplifier 24 supplying the demodulated signal to a loud speaker 23, an analogue switch 25 interposed between the receiving circuit 22 and the low frequency amplifier 24, a first squelch signal generating circuit 26 generating a first squelch control signal which may be used to control the analogue switch 25, a second squelch control signal generating circuit 32 generating a second squelch control signal which may be used to control the analogue switch 25, and a selection switch 33 which selects either one of the first and second squelch control signal generating circuits 26 and 32. The first squelch control signal generating circuit 26 generates a first squelch control signal in response to a tone signal and is composed of a bandpass filter 27, a tone signal detector 28, a phase reversal detector 29, an inverter 30 and an AND gate circuit 31. The second squelch control signal generating circuit 32 comprises a noise squelch circuit which produces a squelch signal based upon a noise signal.

A control circuit 40 is provided for controlling the operation of the transmitting circuit 5, the receiving circuit 22 and the selection switch 33, etc. and functions to control selection operations of the speaking channel and a control channel, transmitting and receiving operations of various data signals transmitted through the channel, processing operations based on the data signals and control of the operation of the selection switch 33, for example.

After selecting a speaking channel when a signal E, shown in FIG. 3a, containing a tone signal is received by the receiving circuit 22, a signal F (see FIG. 3b) is output by the receiving circuit 22 is supplied to the low frequency bandpass filter 27 and the phase reversal detector 29. When the tone signal is positive, the inverter 30 outputs a high level signal so that the output of the AND gate circuit 31 becomes the high level, thus supplying to the analogue switch 25 a squelch control signal G as shown in FIG. 3c. Consequently, the analogue switch 25 is turned ON at time $t_4$ so that the received signal is supplied to loudspeaker 23 via low frequency amplifier 24. Thereafter when the phase of the tone signal F is reversed at time $t_5$, the phase reversal is detected by phase reversal detector 29 and the output of the inverter 30 becomes a low level. As a consequence, the output of the AND gate circuit 31, that is the squelch control signal G, becomes the low level. This signal G is applied to the analogue switch 25 via selection switch 33 to turn OFF the analogue switch, whereby the demodulated output signal H shown in FIG. 3d becomes the low level. The reason that the phase of the tone signal is reversed at time $t_2$ (see FIG. 2) at which the press to talk switch 10 is turned OFF lies in that no detection delay occurs when compared with a case in which absence of the tone signal is detected at time $t_2$. The control circuit 40 controls the selection switch 33 such that it selects the first squelch control signal generating circuit 26 when a speaking channel is selected, whereas when a control channel is acquired, it selects the second squelch control signal generating circuit 32.

FIG. 4 illustrates one example of a prior art tone signal generating circuit 8 provided for the transmitter 1 shown in FIG. 1, in which an oscillator 6 is composed of a sine wave oscillator 35, a variable resistor 36, a capacitor 37 and an analogue switch 38. Thus the oscillator 6 produces a tone signal S1 (see FIG. 5a) whose frequency is determined by the values of the variable resistor 36 and capacitor 37. As shown in FIG. 5b, the analogue switch 38 sends a tone signal S2 to a phase reversal circuit 7 only when the output of the OR gate circuit 16 of the press to talk signal delay circuit 9 is at the high level.

The phase reversal circuit 7 is composed of analogue switches 39 and 40, inverter 41 and operational amplifier 42 having a unity gain. When the output of the AND gate circuit 14 of the press to talk signal delay circuit 9 is at a low level, the switch 40 is ON while the switch 39 is OFF, whereby a tone signal S3 shown by FIG. 5c is applied to the noninverting terminal of the operational amplifier 42. When the output of the AND gate circuit 14 becomes the high level, the switch 39 is ON and the switch 40 is OFF so that a tone signal S4 shown by FIG. 5d is applied to the inverting input terminal of the operational amplifier 42. Accordingly, a tone signal S5 whose phase has been inverted at time $t_2$ as shown in FIG. 5e appears at the output terminal 43 of the tone signal generating circuit 8 and the tone signal S5 is sent out to the transmission circuit 5.

In the tone signal generating circuit 8 shown in FIG. 4, because its oscillator 6 contains sine wave oscillator 35 which is of a complicated construction, and moreover because its oscillation frequency is determined by the values of variable resistor 36 and capacitor 37, these component parts should be accurate and should have excellent temperature characteristics, causing the components to be expensive. If transmission apparatus equipped with a tone signal generating circuit 8 is mounted in a motor car, due to the large temperature variations in the motor car, the accuracy degrades due to the temperature characteristics. To prevent such degradation it is necessary to use expensive parts having better temperature characteristics. Moreover, as the accuracy of the tone signal degrades it is impossible to transmit a large number of tone signals in a limited tone signal frequency bandwidth, thus failing to efficiently use the frequency bandwidth. Moreover, in order to reverse the tone signal it is necessary to provide an exclusive phase inverting circuit 7. In addition, it is necessary to use three analogue switches 38, 39 and 40 for the purpose of controlling the tone signals, which creates problems regarding space and cost.

SUMMARY OF THE INVENTION

Accordingly, it is an object of this invention to provide a novel tone signal generating system capable of eliminating various defects of the prior art tone signal generating circuit which can readily generate a highly stable and accurate tone signal with inexpensive and simple construction.

According to this invention, a tone signal is formed by repeatedly reading out digital data stored in memory means. More particularly, a predetermined waveform signal is stored in the memory means as a plurality of sampling point amplitude value data and these data are repeatedly read out at a predetermined speed. A quasi-sine waveform signal is formed based upon the read out data and harmonic components are eliminated from the quasi-sine waveform signal by using a lowpass filter, thereby forming the desired tone signal.

With this construction, because the frequency of the resulting tone signal is determined by a clock signal and the content of the memory means, a highly accurate tone signal can readily be obtained. Moreover, the frequency can be readily changed. Where reversal of the phase is required, the phase shifting of the signal can be readily achieved by merely changing a designated address of the memory means. For this reason, the tone signal generating system of this invention can be applied to various applications. Moreover, since the resulting tone signal is highly accurate, many more tone signals can be transmitted in a limited frequency band, whereby the frequency band width can be more efficiently utilized.

Moreover, the tone signal generating circuit of this invention, which can produce a highly accurate tone signal having excellent temperature characteristics, is of a compact and inexpensive construction and does not require a complicated circuit.

DESCRIPTION OF THE PREFERRED EMBODIMENT

Figure 6:
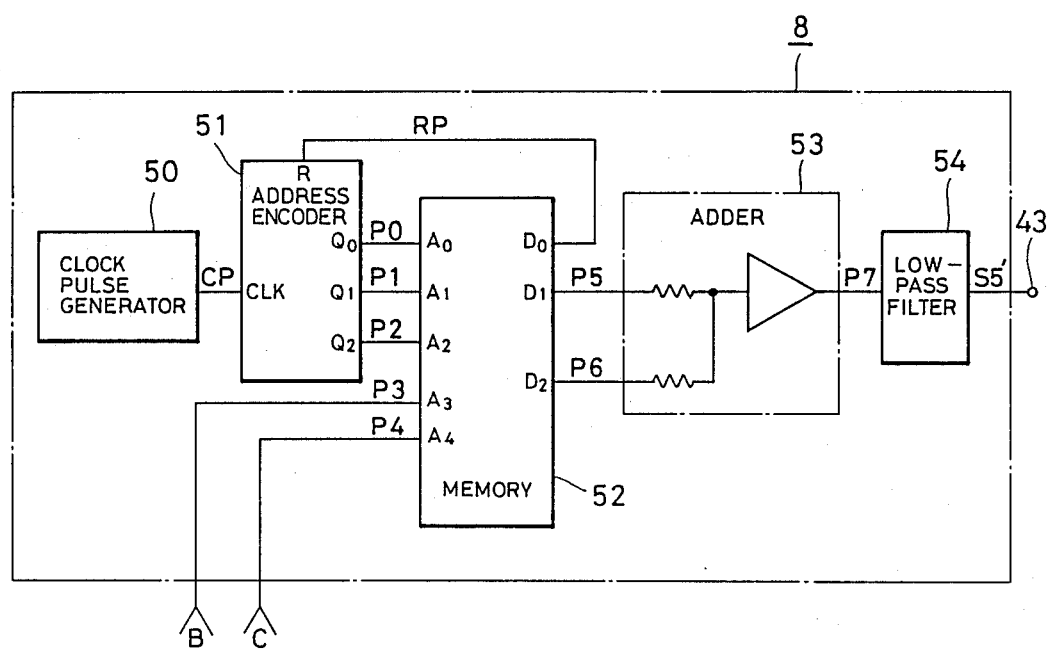
FIG. 6 is a block diagram showing a tone signal generating circuit embodying the invention.

FIG. 6 shows one example of the tone signal generating system embodying the invention comprising a clock pulse generator 50 in the form of a temperature compensated crystal oscillator TCXO, an address encoder 51, an memory element a read only memory, or (ROM) 52, an adder 53 and a lowpass filter 54. In this embodiment, tone signal waveforms are stored with data $D_1$ and $D_2$ each having two bits in terms of 6 sampling point amplitude values. The memory content is shown in the following table I.

TABLE I

| sampling point | address | D1 | D2 |
|---|---|---|---|
| 1 | m | 0 | 1 |
| 2 | m + 1 | 1 | 1 |
| 3 | m + 2 | 0 | 1 |
| 4 | m + 3 | 1 | 0 |
| 5 | m + 4 | 0 | 0 |
| 6 | m + 5 | 1 | 0 | high level = 1,
low level = 0

Figure 7:
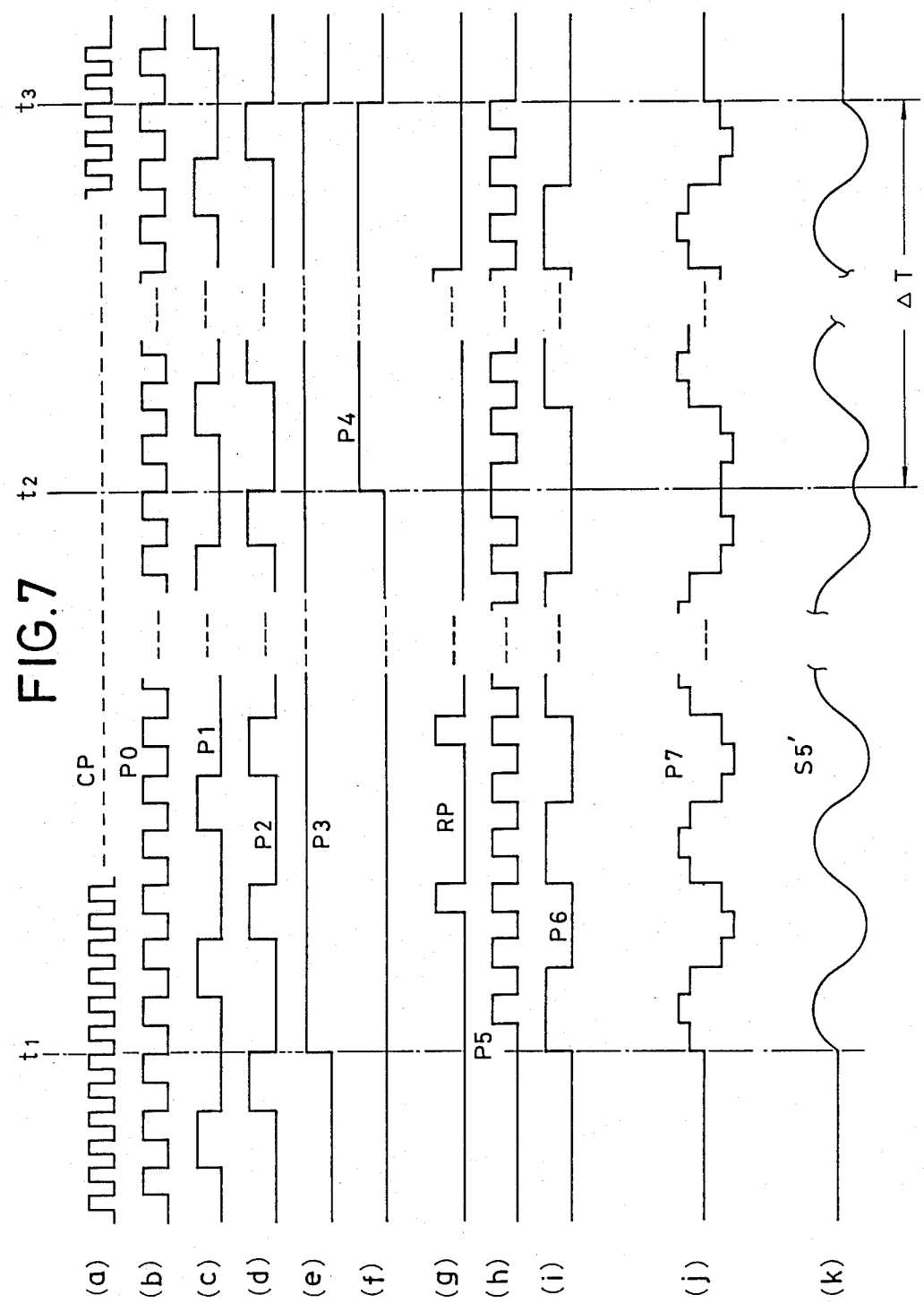
FIG. 7 shows signal waveforms useful to explain the operation of the tone signal generating circuit shown in FIG. 6.

The clock pulse generator 50 applies a clock pulse CP shown in FIG. 7a to the clock terminal CLK of the address encoder 51, which acts as an address generator. Based on this clock pulse CP, output terminals $Q_0$, $Q_1$ and $Q_2$ of the address encoder 51 produce pulse signals $P_0$, $P_1$, and $P_2$ shown in FIGS. 7b, 7c and 7d, respectively. These pulse signals are input to the address terminals $A_0$, $A_1$ and $A_2$ of the memory element 52, thereby designating predetermined addresses from m to m+5 of the memory element 52.

Figure 1:
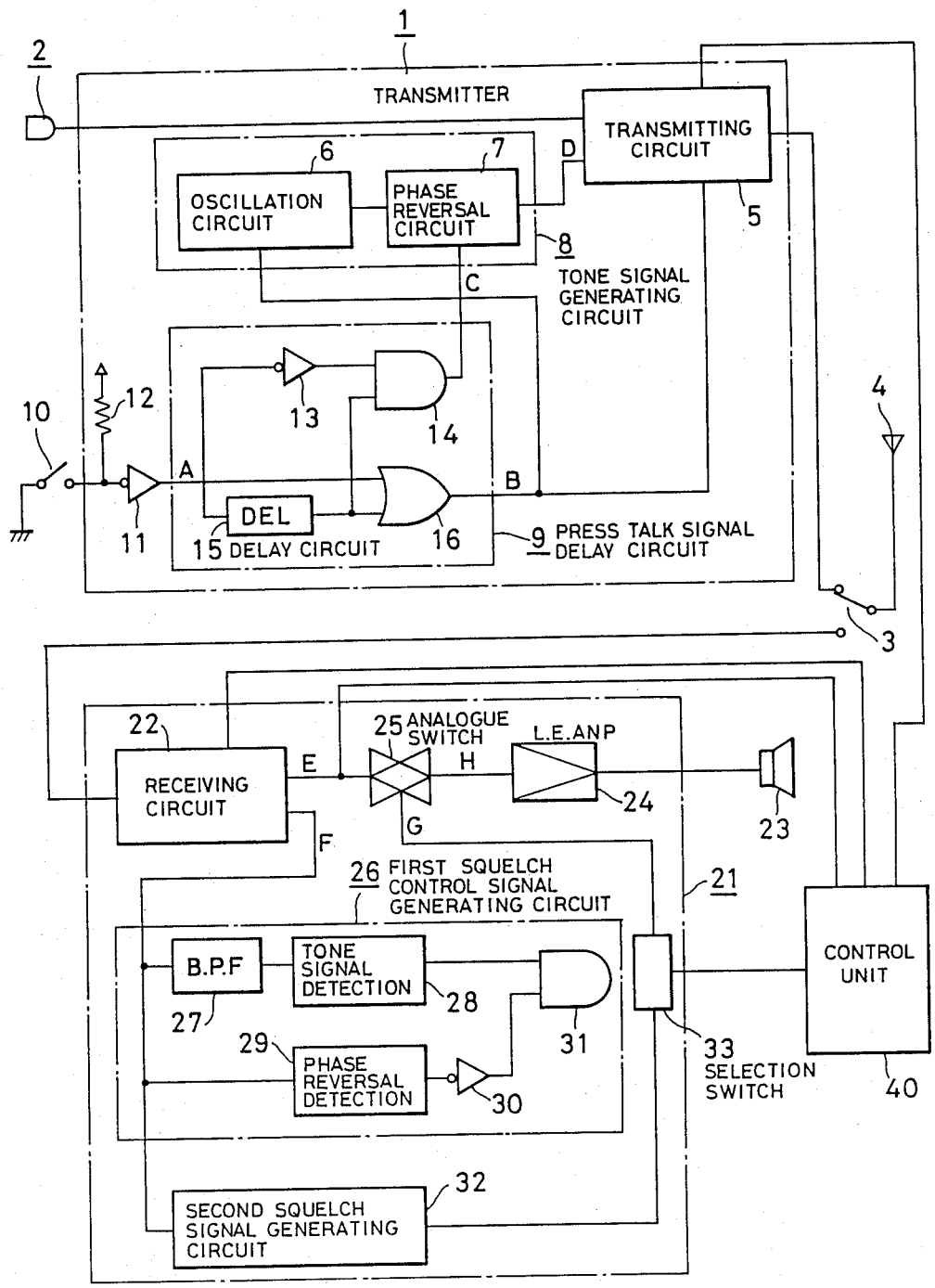
FIG. 1 is a block diagram showing a prior art transmitter/receiver utilizing tone squelching.
Figure 2:
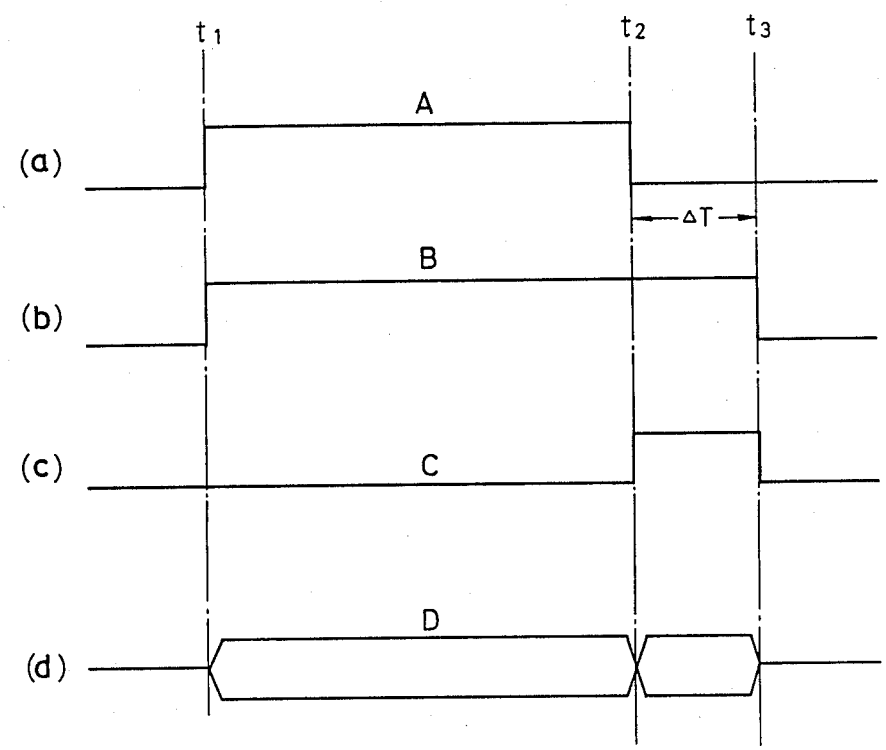
FIG. 2a to 2d, and FIGS. 3a to 3d show waveforms of various signals at various parts of the circuit shown in FIG. 1.
Figure 3:
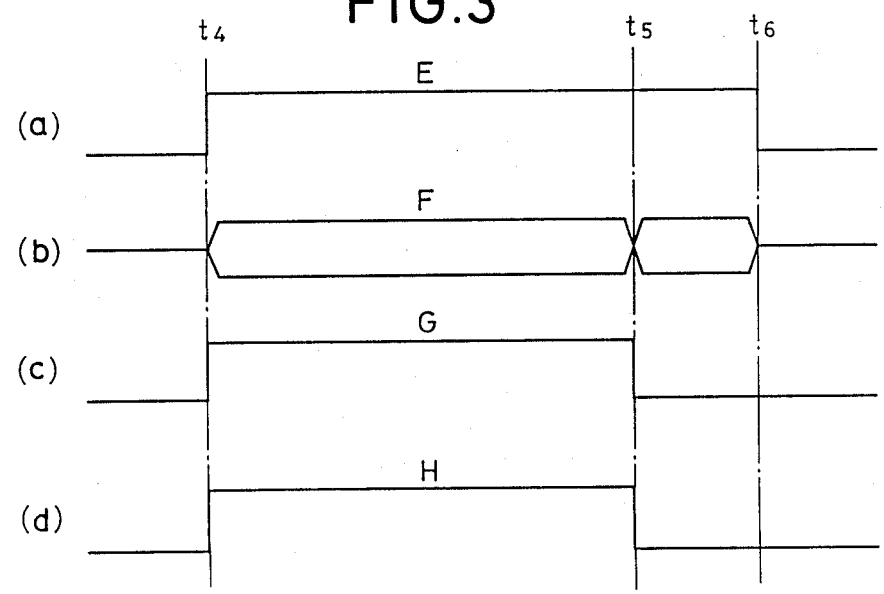
Figure 4:
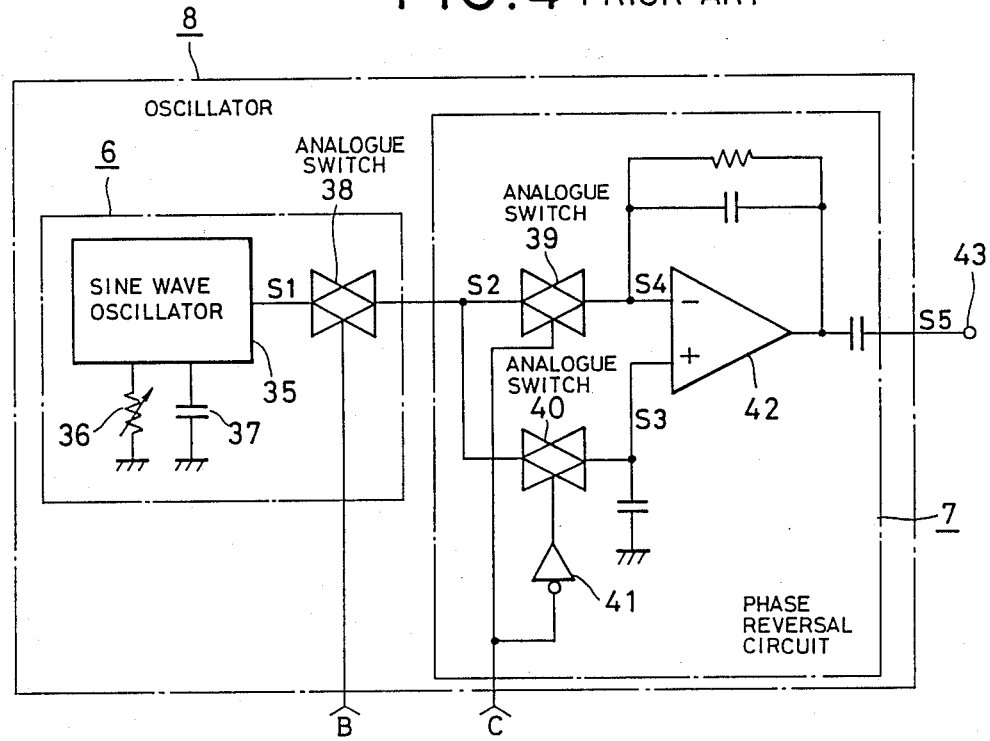
FIG. 4 is a block diagram showing a prior art tone signal generator.

Furthermore, the memory element 52 has address terminals $A_3$ and $A_4$. The output P3 (corresponding to signal B) of the OR gate circuit 16 of the press to talk signal delay circuit 9, shown in FIG. 1, is applied to the address terminal $A_3$, as shown in FIG. 7e. The output P4 (corresponding to signal C) of the AND gate circuit 14 of FIG. 1 is applied to the address input terminal $A_4$, as shown in FIG. 7f. A pulse signal RP shown in FIG. 7g is produced at the output terminal $D_0$ of the memory element 52 corresponding to the address designation operations of pulses $P_0$, $P_1$ and $P_2$, the pulse signal RP being applied to the reset terminal R of the address encoder 51 to act as a reset pulse. Accordingly, the address encoder 52 is reset to its initial state at the build down of the reset pulse RP. The relationship among the pulse signals, designated addresses and the reset pulse RP when signal P3 is at the high level and signal P4 is at the low level is shown in the following Table II.

TABLE II

| $P_0$ | $P_1$ | $P_2$ | address | RP |
|---|---|---|---|---|
| 0 | 0 | 0 | m | 0 |
| 1 | 0 | 0 | m + 1 | 0 |
| 0 | 1 | 0 | m + 2 | 0 |
| 1 | 1 | 0 | m + 3 | 0 |
| 0 | 0 | 1 | m + 4 | 0 |
| 1 | 0 | 1 | m + 5 | 1 | high level = 1,
low level = 0

This means that the address encoder 51 operates as an address generator sequentially designating addresses m through m+5 of the memory element 52. Consequently, the memory element 52 sequentially outputs two bit data $D_1$ and $D_2$ according to Table I. FIG. 7h shows a pulse signal $P_5$ formed by data $D_1$ as a result of the operation described above, while FIG. 7i shows a pulse signal $P_6$ formed by data $D_2$. These two pulse signals $P_5$ and $P_6$ are applied with predetermined weights to adder 53 and then added together. As a consequence, the adder 53 produces a quasi-sine wave signal $P_7$ having a predetermined period as shown in FIG. 7j.

Figure 5:
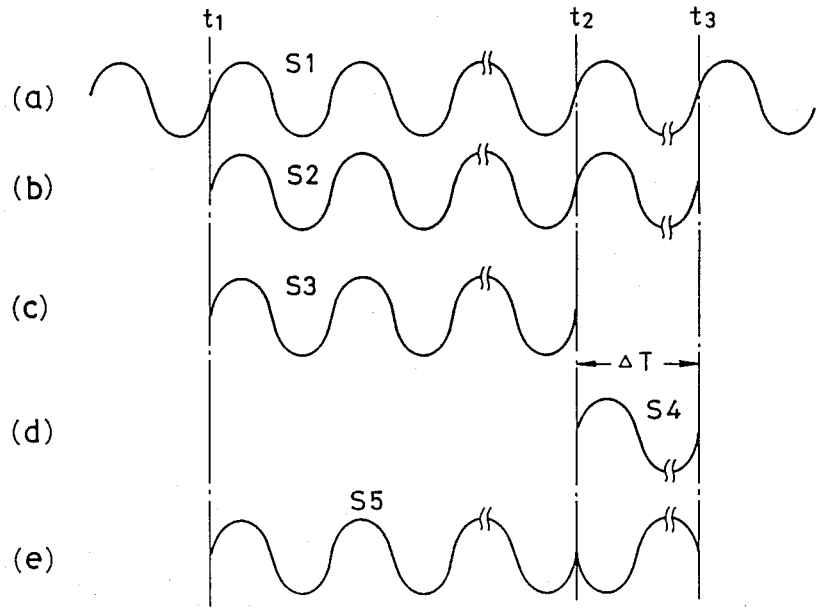
FIG. 5a to 5e are waveforms at various parts of the tone signal generator shown in FIG. 4.

By passing the resulting quasi-sine wave signal $P_7$ through the lowpass filter 54, a tone signal $S_5'$ of a sine waveform similar to that of the tone signal $S_5$ shown in FIG. 5e is obtained at the output terminal 43 of the tone signal generator 8.

In this case, since the third harmonic of the output signal $P_6$ of the memory element 52 is cancelled by the output signal $P_5$, a tone signal of higher accuracy can be obtained.

When the signal $P_4$ becomes the high level, the polarity of the tone signal is reversed by a factor of A/2. The reversal of the tone signal is effected by shifting, by means of the signal $P_4$, the designated addresses of the memory element 52 determined by pulse signals $P_0$, $P_1$ and $P_2$. More particularly, when signal $P_4$ becomes the high level, the designated address of the memory element 52 is advanced by 16 addresses, and the relationship among signals $P_0$, $P_1$ and $P_2$, addresses, signal RP and data $D_1$ and $D_2$ is shown in the following Table III.

TABLE III

| $P_0$ | $P_1$ | $P_2$ | address | RP | $D_1$ | $D_2$ |
|---|---|---|---|---|---|---|
| 0 | 0 | 0 | n | 0 | 1 | 0 |
| 1 | 0 | 0 | n + 1 | 0 | 0 | 0 |
| 0 | 1 | 0 | n + 2 | 0 | 1 | 0 |
| 1 | 1 | 0 | n + 3 | 0 | 0 | 1 |
| 0 | 0 | 1 | n + 4 | 0 | 1 | 1 |
| 1 | 0 | 1 | n + 5 | 1 | 0 | 1 |

In the above table III, "1" and "0" respectively represent the high and the low levels, and n=m+16.

Thus, signals representing times $t_2$ through $t_3$ shown in FIGS. 7h and 7i are outputted from the memory element 52 and the produced tone signal is reversed as shown at times $t_2$ through $t_3$ shown in FIG. 7k.

If signals P3 and P4 both become low level, the tone signal is stopped because the memory is prohibited from accessing address regions m to m+5 and n to n+5. The output data $D_1$ and $D_2$ become low level according to the contents of another address region.

Figure 8:
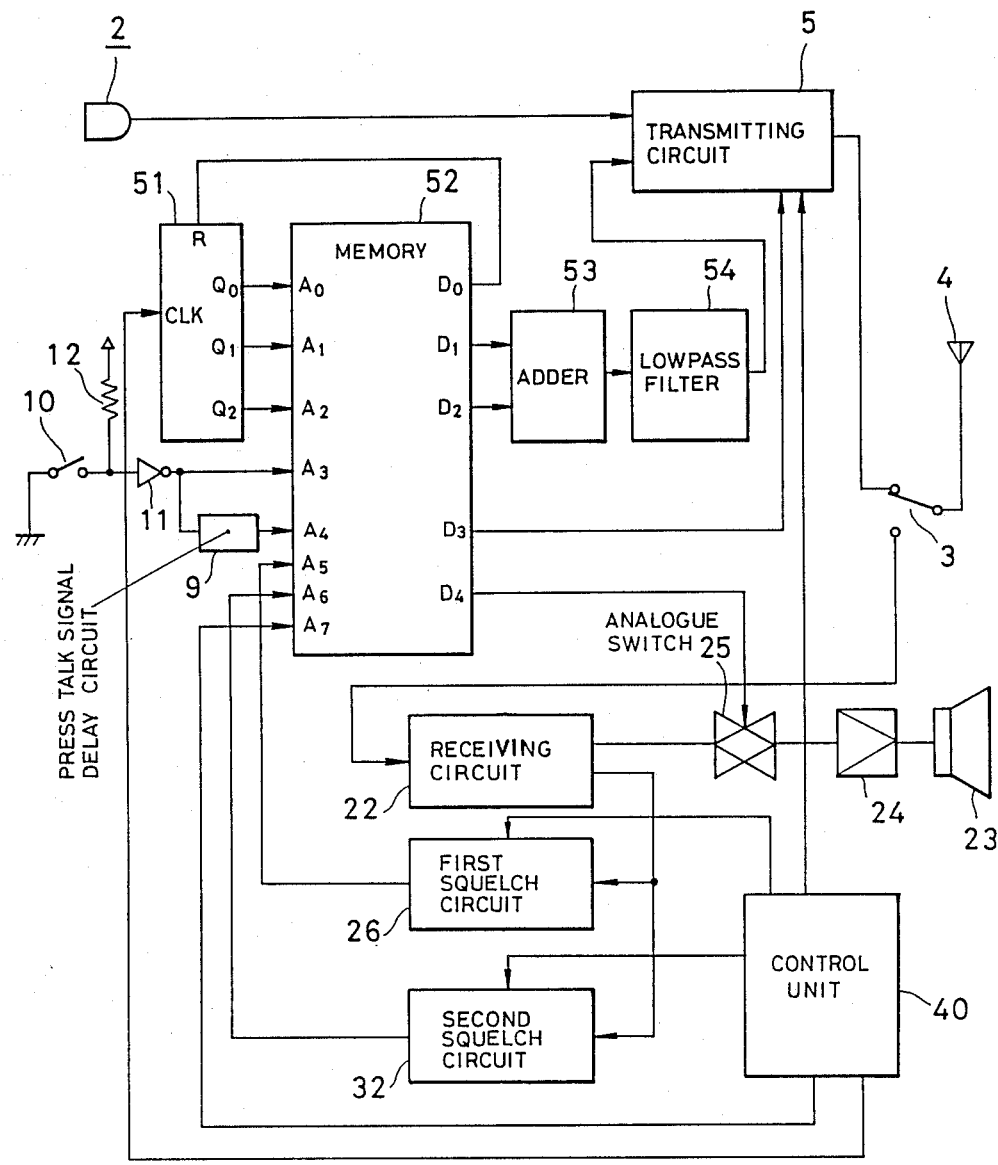
FIG. 8 is a block diagram showing one example of a transmitter/receiver incorporated with the tone signal generating system embodying the invention.

FIG. 8 shows one example of a transmitter receiver containing the tone signal generating system embodying in the invention, in which elements corresponding to those shown in FIG. 1 are designated by the same reference characters. In this example, a memory element 52 generates a tone signal and forms a delay request signal B for the transmitting circuit 5, shown in FIG. 1, and squelch control signal G for the analogue switch 25. More particularly, in FIG. 8, data $D_3$ corresponds to the delay request signal B while data $D_4$ corresponds to the squelch control signal G, and a portion of the press to talk signal delay circuit 9 and the selection circuit 33 utilize the memory element 52 in common.

The output of a first squelch circuit 26, acting as a tone squelch circuit, is applied to the input $A_5$ of the memory element 52, while the output of a second squelch circuit 32 acting as a noise squelch circuit is supplied to the input terminal $A_6$ of the memory element 52. A selection signal output by the control unit 40, which becomes high level when the tone squelch is selected and becomes low level when the noise squelch is selected, is sent to the input $A_7$ of the memory element 52. The outputs $D_3$ and $D_4$ are applied to the transmitting circuit 5 and the analogue switch 25 respectively. The output of the inverter 11, corresponding to the operating states of the press to talk switch 10, is applied to the input $A_3$ of the memory element 25, while the output of delay circuit 15 obtained by delaying the output of the inverter 11 is applied to the input $A_4$ of the memory element 25. The relationship among inputs $A_3$ and $A_4$ and output P3 and the relationship among inputs $A_5$ and $A_6$ and output $P_4$ are shown in the following Tables IV and V.

TABLE IV

| $A_3$ | $A_4$ | $D_3$ |
|---|---|---|
| 0 | 0 | 0 |
| 1 | 0 | 1 |
| 0 | 1 | 1 |
| 1 | 1 | 1 | high level = 1,
low level = 0
* = indefinite

TABLE V

| $A_5$ | $A_6$ | $A_7$ | $D_4$ |
|---|---|---|---|
| 0 | * | 1 | 0 |
| 1 | * | 1 | 1 |
| * | 0 | 0 | 0 |
| * | 1 | 0 | 1 | high level = 1,
low level = 0
* = indefinite

The tone signal is generated in the same manner as in FIG. 6. As above described, the circuit shown in FIG. 8 operates in the same manner as that shown in FIG. 1 but the circuit is greatly simplified.

The memory element 52 can also be used for generating an alert signal informing the operator that a predetermined transmission time has elapsed. In this manner, by providing a memory region in the memory element 52 utilized for producing various control signals other than the tone signal, various controls can be made.

Although in the foregoing embodiment, two output signals are produced by the memory element 52, the two signals are synthesized and a tone signal is produced based on the synthesized signal, the tone signal can also be formed based on a single output signal or a synthesized signal of three or more output signals. The press to talk delay circuit 9 can be constituted by the memory element 52. More particularly, this can be accomplished by inputting to the address terminal of the memory element 52 a signal produced by the operation of the press to talk switch 10 as an address signal, and obtaining signals $P_3$ and $P_4$ as output signals $P_3$ and $P_4$ based on the address signal and by reapplying these signals to the memory element 52 as address signals. Although, the foregoing embodiment is suitable for transmission apparatus utilizing the tone squelching system, the system of this invention may be used for transmission apparatus in which tone signals are used as various data signals.

What is claimed is:

1. A system for generating a tone signal for controlling a communication operation in a communication apparatus, comprising:
    memory means for storing a plurality of data, each of said data consisting of at least 2 bits;
    read out means connected to said memory means for repeatedly and successively designating the addresses of portions of said memory means at a predetermined rate to repeatedly read out said data from said memory means for forming and outputting a plurality of pulse signals each corresponding to a bit of said data;
    adder means responsive to said pulse signals output from said memory means for applying predetermined weights to said plurality of pulse signals output from said memory means and for adding together the weighted pulse signals;
    lowpass filter means connected to said adder means for eliminating the harmonic components from a signal output from said adder means so as to form a desired tone signal; and
    reversing means connected to said memory means to cause said memory means to skip addresses designated by said read out means by a predetermined value for reversing the phase of the tone signal output from said lowpass filter means, wherein a control operation of said communication apparatus is initiated.

2. The system according to claim 1 wherein said memory means is operative to store sets of data corresponding to one period of said tone signal.

3. The system according to claim 1 wherein said memory means comprises a read only memory.

4. The system according to claim 1, wherein said memory means stores A sets of data where A is an even number, each data set corresponding to the amplitude value of said tone signal at respective sample points, said A sets of data being stored at address regions comprised of addresses n through n+A-1 where n is any integer number, and wherein,
    said read out means designates the address n as an initial address and resets the address to the initial address n when the address reaches n+A-1, said designating and resetting operation being repeatedly performed, and wherein
    said reversing means forwards said address by A/2 in order to reverse the phase of said tone signal.

5. The system according to claim 1 wherein said memory means includes means for storing control signals for each component of said communication apparatus at addresses other than addresses n through n+A-1 and generates a predetermined control signal corresponding to the designation of said address.

* * * * *